Dec. 2, 1969 W. KE-CHIN YUAN 3,482,055
EXECUTIVE OVERRIDE
Filed May 2, 1966
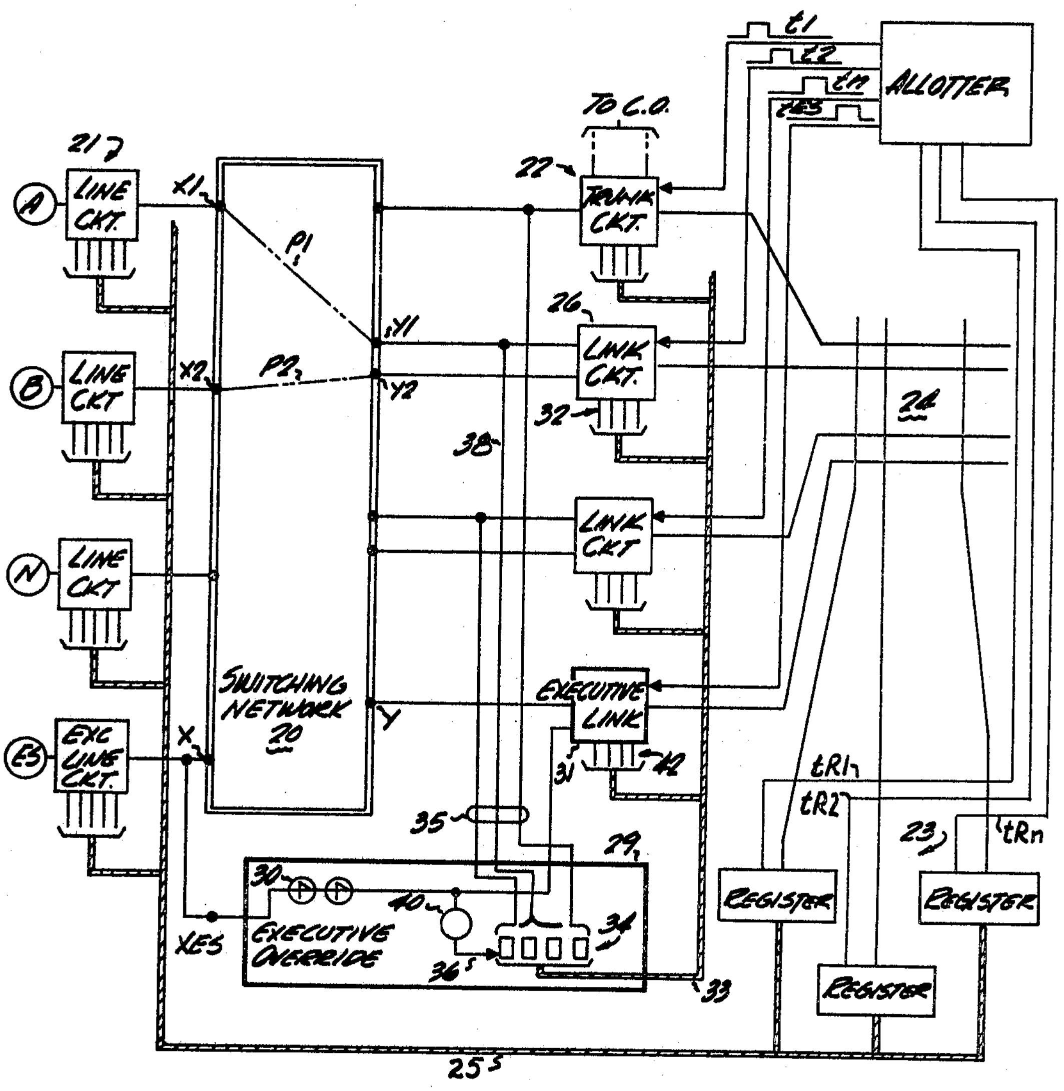
INVENTOR
WILLIAM K.C. YUAN
BY
[signature]
ATTORNEY 3,482,055

EXECUTIVE OVERRIDE

William Ke-Chin Yuan, Ridgewood, N.J., assignor to International Telephone and Telegraph Corporation, New York, N.Y., a corporation of Maryland Filed May 2, 1966, Ser. No. 546,776
Int. Cl. H04m 3/42
U.S. Cl. 179—18 9 Claims

ABSTRACT OF THE DISCLOSURE

A double ended subscriber line is connected to both sides of a PNPN diode network. When the line is called, access is through the line side of the network and the call progresses in a normal manner. When the line is calling, access is through the link side and the subscriber can control the system to perform any unusual functions. Here the function is executive override.

This invention relates to control circuits for electronic switching systems and more particularly to circuits for giving executive override service in such systems.

As used herein, the term "switching network" means an array of crosspoint devices for selectively extending electrical paths to interconnect one circuit with another circuit. The circuits which are so interconnected may take many different forms; however, it is convenient to refer to them here, by way of example, as subscriber lines, and control circuits. The paths are generally extended via these control circuits (often called "links," "registers," or "junctors") which first complete a separate path through the network to each line and then join the separate paths via a voice gate. One example of a network such as that described herein, is found in U.S. Patent 3,204,044 entitled, "Electronic Switching Telephone Systems," granted Aug. 31, 1965 to V. E. Porter, and assigned to the assignee of this invention.

The term "executive right-of-way" refers to an arrangement for making a connection with a station at a time when that station is busy. In greater detail, the various subscriber stations may call each other through the network. Usually, these calls may be completed only if the called station has not been made busy as a result of a previous call. However, designated stations (called "executive stations") may gain access to other stations without regard as to whether such other stations are or are not busy. This access is selectively allowed at the option of the subscriber having access to the executive station and certain executive override equipment controlled therefrom. That is, the executive station seeks a connection. Then, the control circuit conducts a busy test and seizes the called station or returns busy tone (as required). If the executive station user hears busy tone and still wishes to have a connection, he forwards a signal and the called station is seized despite its buty condition.

Accordingly, an object of the invention is to provide new and improved control systems, especially—although not exclusively—for use in self-seeking, current controlled electronic switching telephone systems. Here an object is to provide for executive override. In particular, an object is to provide a subscriber controlled feature in a system which is too large for an inclusion of such feature in every control circuit and too small for a specialized common control devoted entirely to the feature.

Another object of the invention is to provide for giving additional features in smaller existing systems without simultaneously either obsoleting the design of such smaller systems or making an uneconomical, overgrown large system.

In keeping with an aspect of this invention, an executive right-of-way override feature is provided by means of executive control circuits which are individually associated with the executive stations. These control circuits are provided in addition to the control circuits which are normally connected to the control side of a self-seeking, current controlled network. The executive station is so connected to the control side of the network via its individual one of these executive control circuits for the purpose of originating calls. The executive station is also connected to the line side of the network for the purpose of receiving calls. Thus, each executive station is connected to the network via a double ended subscriber line which allows the station to behave both as the lines and the control circuits behave. This behavior is not only useful in giving the described executive override feature, but is also useful in giving other features as well. The exact nature of such other features will readily occur to those skilled in the art.

The above mentioned and other features of this invention and the manner of obtaining them will become more apparent, and the invention itself will be best understood by reference to the following description of an embodiment of the invention taken in conjunction with the accompanying single sheet of drawing which shows a block diagram of an electronic switching system incorporating the general principles of the invention as it is used to provide executive right-of-way.

An exemplary electronic switching system comprises a principal switching network 20 having a plurality of lines 21 connected to one side, and links or other connection control circuits 22 connected to the other side. It should be noted that the line from the executive station ES is double ended, having appearances X, Y on both the line and control sides of the network. Thus, an executive station can behave as both a line circuit and a control circuit behave.

The registers shown at 23 perform some of the functions normally required to establish a call, such as: called line selection, busy test, transmission of ring signal, and any other desired operations. These registers and other special function circuits (not shown) are accessible to the link circuits 22 via one or more auxiliary switching networks, such as 24. Each link may be given such access through this auxiliary network 24 to any individual register 23 during the separate time frames $t1$–$t$ES which individually identify the links. A path then fires through the auxiliary network 24 to any idle marked access point associated with the appropriate register circuits 23 which then returns dial tone, receives and stores dial pulses, marks cable 25 with the identity of the called line, and causes the requested switch path to be established. At this time, the function of the line circuit 21 is to recognize its code when register 24 marks cable 25. If the called line B is in an idle condition it marks point X2 and causes the establishment of the switch path P2. The function of the link 26, assigned to this call, is to mark the terminate access point, Y2, of the desired path P2. All of this is accomplished under the control of the register 24 when it marks the cable 25 and signals the link. Immediately after the register functions are completed, the path through the auxiliary matrix 24 is dropped. Thereafter, the link 26 controls and supervises the call while the register 23 goes on to serve another call.

The foregoing description exemplifies an ordinary call, not requiring any special features such as executive right-of-way. Another and more complicated type of call situation occurs when an executive station ES tries to cut in on the busy call here represented by the paths P1, P2.

If an executive station ES is called, it behaves exactly as any other called station behaves by marking the line side of the network 20 point X when the code identifying station ES appears on the cable 25.

If an executive station ES is calling, it behaves as a link circuit 22 behaves. In greater detail, when an executive station ES goes off-hook, it marks a point XES of an executive override circuit 29 and fires a number of crosspoints 30 equal to the number of crosspoints which would fire if the call were completed via an orginating path( such as P1) through the network 20. These crosspoints 30 serves no switching or other logic functions, but they do maintain a symmetry of electrical characteristics as compared with the other paths through the network 20. After the crosspoints 30 fire, the executive line ES is connected directly into an executive link 31 which is individually associated with this line.

Link 31 closes a crosspoint in auxiliary network 24 and seizes a register 23 in exactly the same manner that any other link would seize a register. The register performs exactly the same functions that it always performs during comparable steps in any other call. If the called line is idle when the conductors 25 are marked, the call is completed exactly as it is always completed.

During termination if the called line is busy, the register 23 associate with the executive link 31, will mark the called station at its alloted time over the cable 25 so that there is a slight voltage change at the called station network access point X2. The conversing subscribers do not recognize this voltage change, but the link 26 detects it. Responsive thereto, link 26 identifies itself by appyling a coded marking at its output terminals 32. At this time the executive override circuit 29 is enabled to listen for the code marking on cable 33, there is a timed coordination such that only the appropriate link identifying marks on conductors 33 are stored in the executive override circuit 29.

The link identifying marking on the cable 33 sets four flip-flop circuits 34 in the same coded combination which was marked out at 32. Depending upon the code of this combination, one and only one wire in a group of wires 35 is connected to a wire 36 leading to the calling executive station ES. Under the present assumption, this is the wire 38 because it is the wire that is connected to the link which identified itself at 32.

Means are provided for preempting a line with an executive override. In greater detail, the subscriber at station ES receives busy tone when the system discovers that the called line is busy. If he elects to do so, the subscriber at the executive station may hang up when he hears busy tone and thereby end the attempt to complete the call. On the other hand, if he so elects, he may dial a digit and preempt a connection to the called line. Here, it is assumed that the digit "1" is dialed to obtain such preemption.

The executive override circuit 29 recognizes the digit "1" as its command to preempt. Next, a burst of preemption tone is sent over wire 38 to the subscribers connected to link 26. Then, after a slight time delay which is long enough to allow the conversing subscribers to stop talking about their private affairs, a voice gate circuit 40 closes to allow the subscriber at the executive station ES to talk to both the subscribers A and B. Thereafter, the subscribers may take any additional action which they elect to take.

The drawing shows the executive link identifying connections at 42 which allows one executive station to preempt a connection to another executive station. This is accomplished in the same manner that all other calls are preempted. However, if an executive station user does not want to have his call preempted, he may dial a suffix digit, such as "2," whenever he makes a call. This digit inhibits a gate and precludes a read out at 42 and therefore precludes a response by the circuits 34. Since the circuits 34 remain in a normal condition, the calling station does not cause an executive override. Instead, busy tone continues to be returned, and the executive station user recognizes that he is barred from access.

While the principles of the invention have been described above in connection with specific apparatus and applications, it is to be understood that this description is made only by way of example and not as a limitation on the scope of the invention.

I claim:

1. A switching system comprising a network of electronic crosspoints, a plurality of lines and control circuits, said lines being connected to one side of said network and said control circuits being connected to the other side of said network, means for connecting at least one of said lines to both said one and said other side of said network, and means for causing said one line to function as a line functions when said one line is connected through said network via said one side and for causing said one line to function as a control circuit functions when said on line is connected through said network via said other side.

2. The system of claim 1 and means comprising said control side connection for giving said one line an executive right-of-way over other lies.

3. The system of claim 1 wherein said one line is connected to said other side via a circuit individual to said one line and having a number of crosspoints which provide an electrical symmetry with a corresponding path extending from a line through said network to a control circuit.

4. An electronic switching telephone system comprising a network of crosspoints, a plurality of lines connected to one side and a plurality of links connected to the other side of said network, means for extending paths from calling and called lines connected to said one side through said network to a link connected to said other side, means in said link for interconnecting said paths, means for thereafter attempting to extend a further connection to one of said lines while they are so interconnected in said link, and means responsive to said attempted connection for causing said link to identify itself.

5. The system of claim 4 and means responsive to said identification of a link for selectively extending a connection to said identified link.

6. The system of claim 4 and means whereby said attempted connection is extended, from another of said lines having executive right-of-way capabilities, said executive right-of-way line being connected to both said one side and said other side of said network.

7. The system of claim 6 and control circuit means interposed in said connection between said executive right-of-way line and said other side of said network, said control circuit including means for maintaining electrical symmetry with paths through said network from a line connected to said other side.

8. The system of claim 7 and means in said control circuit for connecting said executive right-of-way line to the link which identifies itself.

9. The system of claim 8 and means associated with some of said lines for selectively precluding the completion of said connection between the executive right-of-way line and the link which identifies itself.

References Cited

UNITED STATES PATENTS

| | | | |
|---|---|---|---|
| 3,327,065 | 6/1967 | Michalopoulos et al. | 179—27 |
| 3,190,965 | 6/1965 | Zarouni | 179—18 |
| 3,003,038 | 10/1961 | Baker et al. | 179—27 |

KATHLEEN H. CLAFFY, Primary Examiner

D. L. RAY, Assistant Examiner